United States Patent
Wu et al.

(10) Patent No.: US 12,455,255 B2
(45) Date of Patent: Oct. 28, 2025

(54) CMOS INTEGRATED HUMIDITY SENSOR WITH BUILT-IN HEATER

(71) Applicant: QUALCOMM Incorporated, San Diego, CA (US)

(72) Inventors: Yufei Wu, San Diego, CA (US); Abhijeet Paul, San Diego, CA (US); Ravi Pramod Kumar Vedula, San Diego, CA (US); Mishel Matloubian, San Diego, CA (US); Periannan Chidambaram, San Diego, CA (US); Hyunchul Jung, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 147 days.

(21) Appl. No.: 18/444,214

(22) Filed: Feb. 16, 2024

(65) Prior Publication Data

US 2025/0264431 A1 Aug. 21, 2025

(51) Int. Cl.
  *G01N 27/22* (2006.01)
(52) U.S. Cl.
  CPC ......... *G01N 27/223* (2013.01); *G01N 27/226* (2013.01); *G01N 27/228* (2013.01)
(58) Field of Classification Search
  CPC .. G01N 27/223; G01N 27/226; G01N 27/227; G01N 27/228; G01N 27/605;

(Continued)

(56) References Cited

U.S. PATENT DOCUMENTS

| | | | |
|---|---|---|---|
| 2011/0179861 A1* | 7/2011 | Grange | G01N 27/225 977/773 |
| 2014/0026652 A1* | 1/2014 | Cummins | G01N 27/223 73/335.04 |

(Continued)

FOREIGN PATENT DOCUMENTS

| | | |
|---|---|---|
| CN | 104914138 A | 9/2015 |
| CN | 105181754 A | 12/2015 |
| WO | WO-2012067488 A1 | 5/2012 |

OTHER PUBLICATIONS

International Search Report and Written Opinion—PCT/US2025/013102—ISA/EPO—Apr. 25, 2025.

*Primary Examiner* — Alvaro E Fortich
(74) *Attorney, Agent, or Firm* — Muncy, Geissler, Olds & Lowe, P.C.

(57) ABSTRACT

A complementary metal oxide semiconductor (CMOS) integrated humidity sensor with built-in heater is disclosed. In an aspect, a capacitive humidity sensor comprises a substrate and a plurality of unit humidity sensors disposed above the substrate. Each unit humidity sensor comprises a resistive heating structure disposed above the substrate, a plurality of capacitive humidity sensors disposed above the resistive heating structure and set apart from each other in a vertical direction, and a top surface at least a portion of which is water-permeable. Each capacitive humidity sensor comprises a pair of interdigitated vertical metal plates extending in a first direction, set apart from each other in a second direction orthogonal to the first direction, and sepa- (Continued)

rated from each other by a moisture-sensitive dielectric disposed between the pair of interdigitated vertical metal plates. At least one capacitive humidity sensor uses a different moisture-sensitive dielectric than another capacitive humidity sensor.

30 Claims, 12 Drawing Sheets

(58) Field of Classification Search
CPC ... G01N 2223/6113; G01N 2223/6116; G01N 2223/611; G01N 2223/613; B81B 2203/04; B81B 2203/00; G01R 27/2605; G01R 27/2617; G01R 27/2688; G01R 27/26; H01G 5/16; H01G 5/0136; H01C 1/142
See application file for complete search history.

(56) References Cited

U.S. PATENT DOCUMENTS

| | | | |
|---|---|---|---|
| 2015/0068302 A1* | 3/2015 | Koo | G01N 27/22 |
| | | | 73/335.04 |
| 2017/0138882 A1* | 5/2017 | Koo | G01N 27/225 |
| 2020/0132616 A1* | 4/2020 | Pierre | G01N 27/605 |
| 2021/0341407 A1 | 11/2021 | Burkey et al. | |
| 2022/0244207 A1 | 8/2022 | Xiao et al. | |
| 2022/0299465 A1 | 9/2022 | Walewyns et al. | |

* cited by examiner

CMOS INTEGRATED HUMIDITY SENSOR WITH BUILT-IN HEATER

BACKGROUND OF THE DISCLOSURE

1. Field of the Disclosure

Aspects of the disclosure relate generally to complementary metal oxide semiconductor (CMOS) integrated humidity sensors.

2. Description of the Related Art

Humidity sensors have a diverse application area and high demand (e.g., smart home, control of industrial processes, electronics, and semiconductor areas). There are different types of humidity sensors, including those that use capacitive sensing, resistive sensing, and optical sensing. Capacitive humidity sensors include a dielectric layer and two plates, which are usually interdigitated electrodes. The dielectric is a material with the property that the dielectric constant will change as the moisture content within the dielectric changes, and the range and sensitivity of the capacitive humidity sensor is determined in large part by the choice of dielectric used. CMOS integrated humidity sensors have the advantage of monolithic integration with other control circuitry.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a complementary metal oxide semiconductor (CMOS) integrated humidity sensor includes a substrate and a plurality of unit humidity sensors disposed above the substrate. Each unit humidity sensor comprises a resistive heating structure disposed above the substrate and a plurality of capacitive humidity sensors disposed above the resistive heating structure and set apart from each other in a vertical direction. Each unit humidity sensor has a top surface that at least a portion of which is water-permeable. Each capacitive humidity sensor comprises a pair of interdigitated vertical metal plates extending in a first direction, set apart from each other in a second direction orthogonal to the first direction, and separated from each other by a moisture-sensitive dielectric disposed between the pair of interdigitated vertical metal plates.

In an aspect, a method of fabricating a CMOS integrated humidity sensor includes providing a substrate and providing a plurality of unit humidity sensors disposed above the substrate, each unit humidity sensor comprising a resistive heating structure disposed above the substrate and a plurality of capacitive humidity sensors disposed above the resistive heating structure and set apart from each other in a vertical direction, each unit humidity sensor having a top surface that at least a portion of which is water-permeable, wherein each capacitive humidity sensor comprises a pair of interdigitated vertical metal plates extending in a first direction, set apart from each other in a second direction orthogonal to the first direction, and separated from each other by a moisture-sensitive dielectric disposed between the pair of interdigitated vertical metal plates.

In an aspect, an apparatus comprises a substrate and a plurality of unit humidity sensors. Each unit humidity sensor comprises a resistive heating structure disposed above the substrate and a plurality of capacitive humidity sensors disposed above the resistive heating structure and set apart from each other in a vertical direction, each unit humidity sensor having a top surface that at least a portion of which is water-permeable. Each capacitive humidity sensor comprises a pair of interdigitated vertical metal plates extending in a first direction, set apart from each other in a second direction orthogonal to the first direction, and separated from each other by a moisture-sensitive dielectric disposed between the pair of interdigitated vertical metal plates. The apparatus also comprises control circuitry that controls the plurality of unit humidity sensors, that provides power to the resistive heating structures of the plurality of unit humidity sensors, that determines a capacitance associated with at least one of the plurality of unit humidity sensors, and that determines a relative humidity based on the capacitance.

In an aspect, an apparatus comprises a plurality of unit humidity sensor means. Each unit humidity sensor means comprises a resistive heating means and a plurality of capacitive humidity sensor means disposed above the resistive heating means and set apart from each other in a vertical direction, each unit humidity sensor having a top surface that at least a portion of which is water-permeable, each capacitive humidity sensor comprising a pair of interdigitated vertical metal plates extending in a first direction, set apart from each other in a second direction orthogonal to the first direction, and separated from each other by a moisture-sensitive dielectric disposed between the pair of interdigitated vertical metal plates. The apparatus further comprises control circuitry means that controls the plurality of unit humidity sensor means, that provides power to the resistive heating means of the plurality of unit humidity sensor means, that determines a capacitance associated with at least one of the plurality of unit humidity sensor means, and that determines a relative humidity based on the capacitance.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
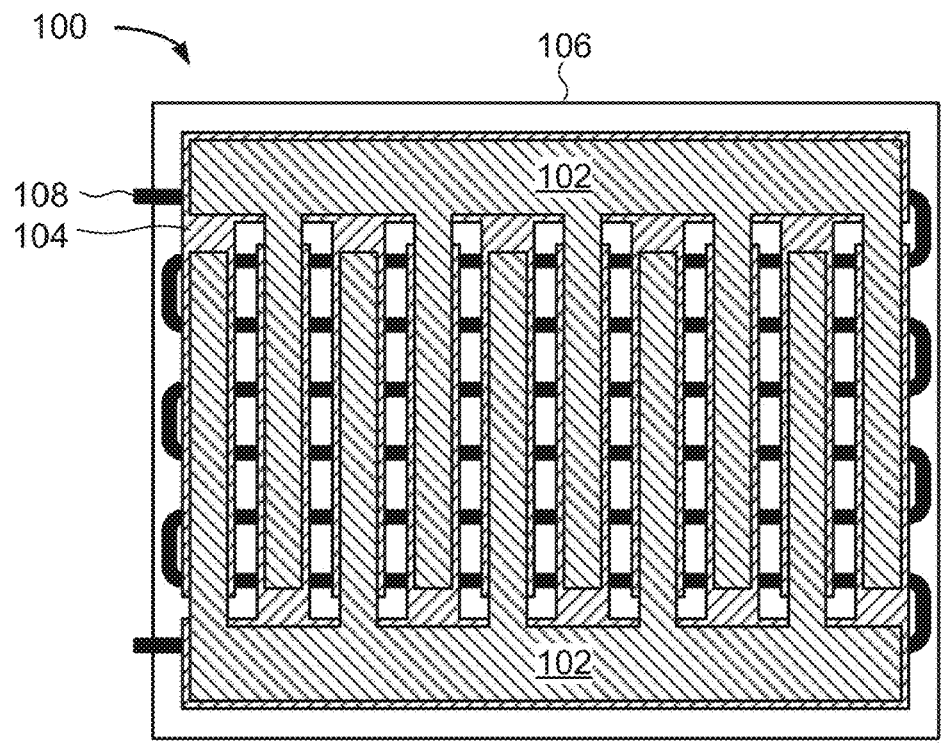
FIG. 1 illustrates the structure of a conventional capacitive humidity sensor.
Figure 1:
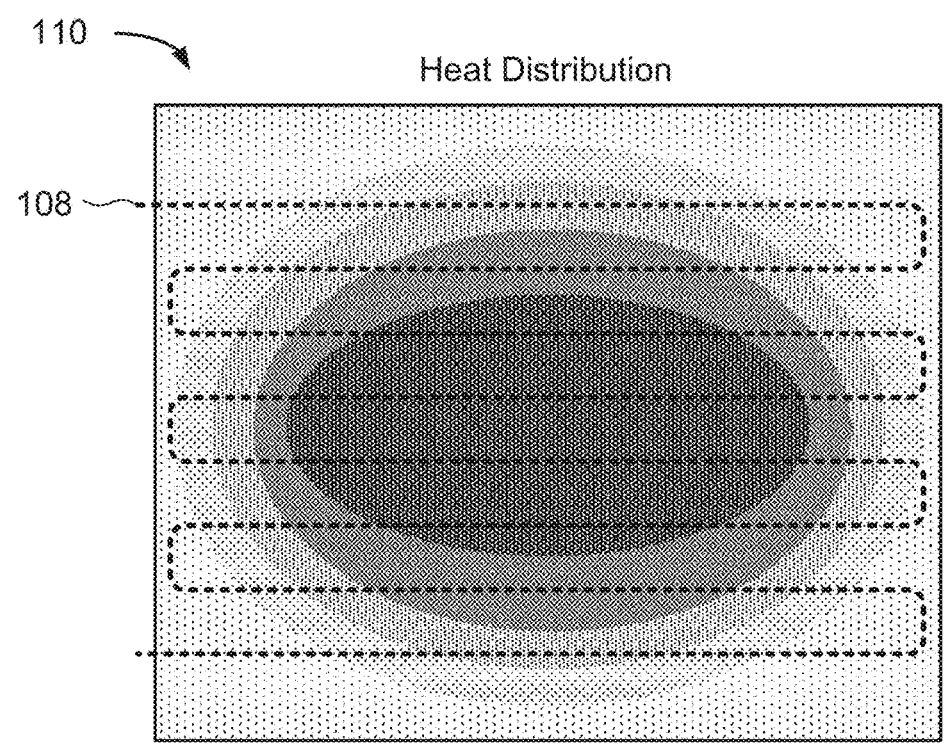

Designs for a complementary metal oxide semiconductor (CMOS) integrated humidity sensor with built-in heater are disclosed. In an aspect, a CMOS integrated humidity sensor comprises a substrate and a plurality of unit humidity sensors disposed above the substrate. Each unit humidity sensor comprises a resistive heating structure disposed above the substrate, a vertical stack of capacitive humidity sensors above the resistive heating structure, above which is a top surface at least a portion of which is water-permeable. Each capacitive humidity sensor comprises a pair of interdigitated vertical metal plates extending in a first direction, set apart from each other in a second direction orthogonal to the first direction, and separated from each other by a moisture-sensitive dielectric disposed between the pair of interdigitated vertical metal plates. At least one capacitive humidity sensor uses a different moisture-sensitive dielectric than another capacitive humidity sensor.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

There are different types of humidity sensors, including those that use capacitive sensing, resistive sensing, and optical sensing. CMOS integrated humidity sensors have the advantage of monolithic integration with other control circuitry. The operation principles of commonly used humidity sensors in CMOS can be classified into capacitive, resistive, and piezo-resistive, with capacitive humidity sensors being among the best in sensitivity and linearity over a wide humidity range. In capacitive humidity sensors, the dielectric is a material with the property that the dielectric constant will change as the moisture content within the dielectric changes. Sensitivity as it relates to a capacitive humidity sensor is defined as the ratio of change of capacitance to change of relative humidity (RH), which, for the purposes of defining a standard, is limited to the range between 10% RH and 90% RH. This type of sensor may occasionally or periodically need to be reset, a term used to refer to the process of removing the moisture from the dielectric material, usually by heating the sensor until the moisture is driven out.

FIG. 1 illustrates the structure of a conventional capacitive humidity sensor 100, showing a top plate 102 and a bottom plate 104 separated by a moisture-sensitive dielectric layer 106, and the heating layer 108. This conventional design has a number of drawbacks, including non-uniform heat distribution, as shown in the heat distribution profile 110, in which hotter areas of the device are darker, which results in inefficient moisture release and longer sensor reset time; limited exposure of the moisture-sensitive dielectric layer 106 to the surrounding environment, which results in limited sensitivity; lack of redundancy, due to the fact that if the capacitor is broken, the entire sensor is unusable; and limited utility as a result of the use of one dielectric material throughout.

Figure 2:
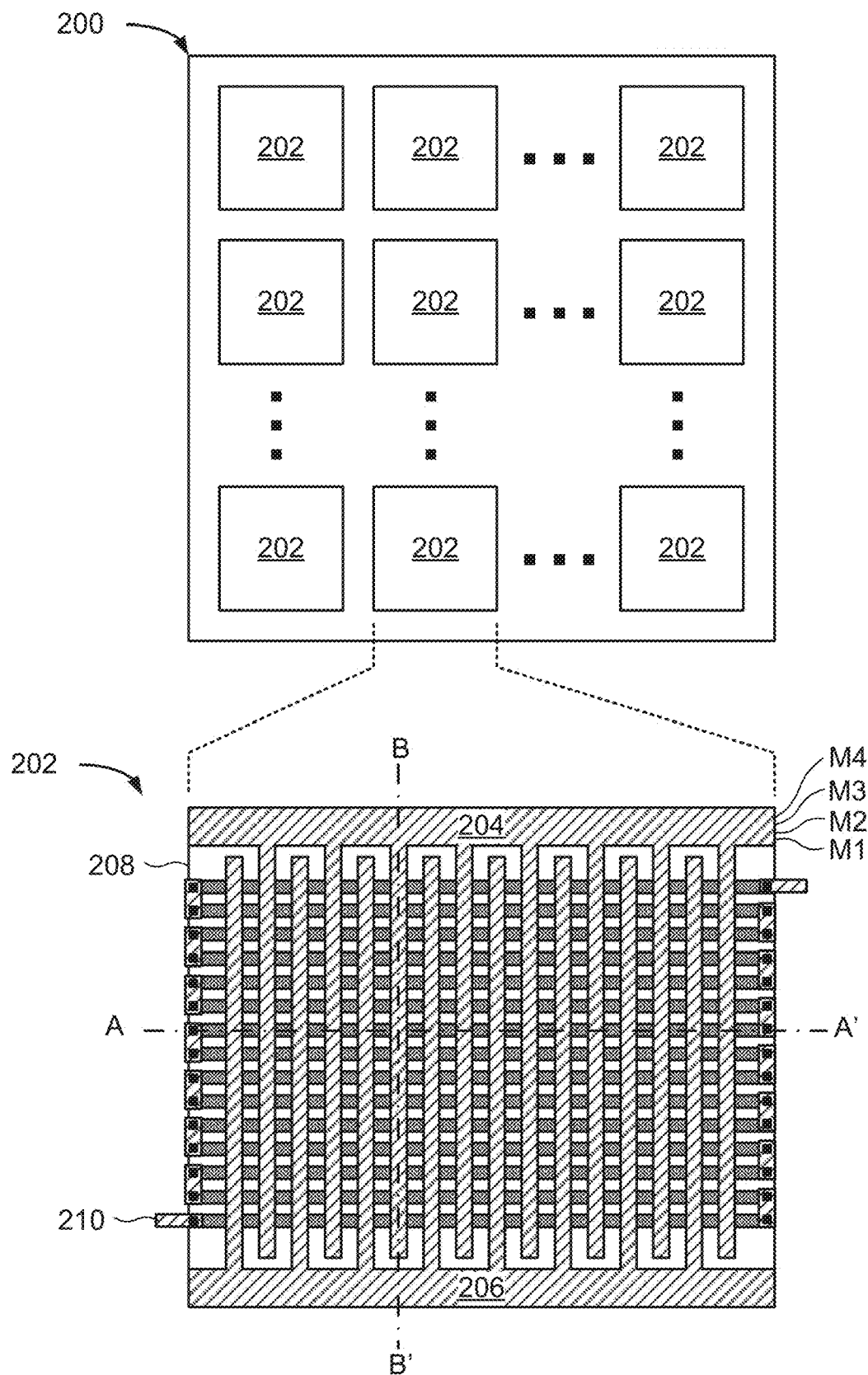
FIG. 2 illustrates a CMOS integrated humidity sensor with a built-in heater according to aspects of the disclosure.

FIG. 2 is a plan view of a CMOS integrated humidity sensor 200 with a built-in heater according to aspects of the disclosure. The humidity sensor 200 comprises a number of unit sensors 202. In some aspects, these unit sensors 202 may be connected in parallel. In the aspect illustrated in FIG.

2, the unit sensors 202 are arranged in an array, but other configurations are also within the scope of the subject matter herein disclosed.

In some aspects, each unit sensor 202 includes its own capacitive sensing element and resistive heating element. In some aspects, the capacitive sensing element uses vertical parallel plate structures, such as metal-on-metal capacitor (MOMCAP) structures, which can reduce the parasitic signal from air and have high sensitivity compared with horizontal plate structures such as those found in the conventional humidity sensor 100. In the example shown in FIG. 2, the MOMCAP structure includes two interdigitated plates, plate 204 and plate 206, separated by a moisture sensitive dielectric material 208. Although only the top layer MOMCAP structure is shown in FIG. 2 for clarity, each of the metal layers (such as M1 through M4, for example) may include its own separate MOMCAP structure and dielectric material.

In some aspects, the dielectric material used in one unit sensor 202 may be different from the dielectric material used in another unit sensor 202. In some aspects, the dielectric material for a MOMCAP structure at one layer of metal within a unit sensor 202 may be different from the dielectric material for a MOMCAP structure at another layer of metal within the same unit sensor 202. In some aspects, the resistive sensing element 210 can be implemented using a poly resistor, a diffusion resistor, or a titanium nitride (TiN) or other back-end-of-line (BEOL) resistor.

Figure 3A:
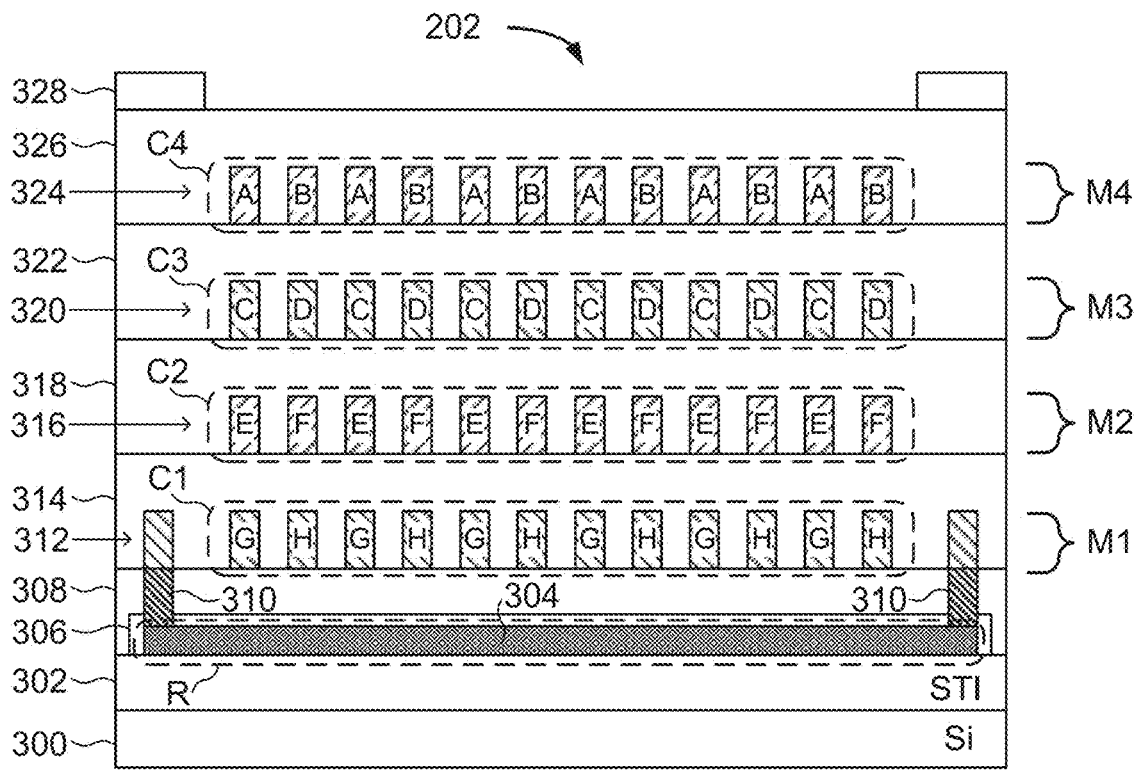
FIG. 3A and FIG. 3B are cross sectional views of a CMOS integrated humidity sensor with a built-in heater according to aspects of the disclosure.

FIG. 3A is a cross sectional view of the unit sensor 202 through cut line A-A'. The example unit sensor 202 shown in FIG. 3A includes a substrate 300, which may comprise silicon. A shallow trench isolation (STI) layer 302 is disposed above or within the substrate 300. Upon the STI layer 302 is a polysilicon structure 304 that is part of the resistive heating element R. The polysilicon structure 304 is enclosed in a first insulating layer 306, both of which are enclosed in a second insulating layer 308. Tungsten plugs 310 provide electrical contact from the element R to metal 1 (M1) structures 312 embedded in a first dielectric layer 314. Some of the M1 structures 312 comprise the interdigitated plates of a M1-level capacitor C1, labeled G and H. Metal 2 (M2) structures 316 are disposed on a top surface of the first dielectric layer 314 and embedded within a second dielectric layer 318. Some of the M2 structures 316 comprise the interdigitated plates of a M2-level capacitor C2, labeled E and F. Metal 3 (M3) structures 320 are disposed on a top surface of the second dielectric layer 318 and embedded within a third dielectric layer 322. Some of the M3 structures 320 comprise the interdigitated plates of a M3-level capacitor C3, labeled C and D. Metal 4 (M4) structures 324 are disposed on a top surface of the third dielectric layer 322 and embedded within a fourth dielectric layer 326. Some of the M4 structures 324 comprise the interdigitated plates of a M4-level capacitor C4, labeled A and B. A passivation layer 328 covers portions of the top surface of the unit sensor 202, but leaves other portions of the top surface exposed to moisture.

Figure 3B:
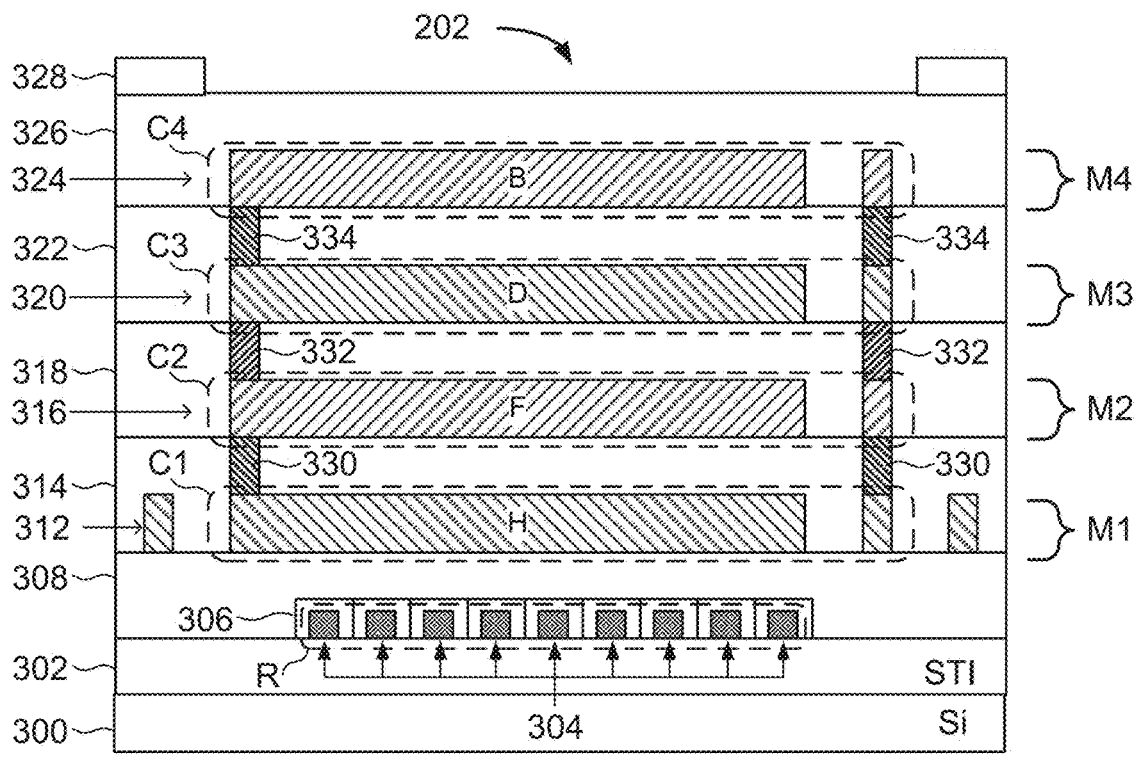

FIG. 3B is a cross-sectional view of the unit sensor 202 through cut line B-B', showing the substrate 300, STI layer 302, multiple fingers of the polysilicon structure 304, the first insulating layer 306, and the second insulating layer 308. FIG. 3B also shows the M1 structures 312, including the interdigitated plate H, the first dielectric layer 314, the M2 structures 316, including the interdigitated plate F, the second dielectric layer 318, the M3 structures 320, including the interdigitated plate D, the third dielectric layer 322, the M4 structures 324, including the interdigitated plate B, the fourth dielectric layer 326, and the passivation layer 328. FIG. 3B also shows layer 1 vias (V1) 330 that connect M1 structures to M2 structures, layer 2 vias (V2) 332 that connect M2 structures to M3 structures, and layer 3 vias (V3) 334 that connect M3 structures to M4 structures.

The range of humidity that can be detected by a particular capacitive humidity sensor and its sensitivity of detection depends upon the specific material used as the dielectric layer. Thus, different moisture sensitive dielectric materials may be best suited to different environmental conditions and sensing requirements such as sensitivity and range. For example, in some use cases, a humidity sensor should be very sensitive, e.g., have a high resolution, within a narrow range of humidity, but in other use cases, a humidity sensor should be able to detect humidity across a wide range of values, in which case a low resolution of humidity values may be acceptable. In yet another use case, high linearity is desirable. To this end, the unit sensor 202 can use different moisture sensitive materials as its dielectric layers.

Thus, in some aspects, all of the dielectric layers within a unit sensor 202 may use the same moisture sensitive material. In some aspects, at least one of the dielectric layers may use a different moisture sensitive material from the other dielectric layers. In some aspects, each of the dielectric layers may use a different moisture sensitive material from all of the other dielectric layers. In some aspects, the dielectric materials used in one unit sensor 202 in the humidity sensor 200 may or may not be the same as the dielectric materials used in another unit sensor 202 of the same humidity sensor. In some aspects, the moisture sensitive materials used in the dielectric layers, or the moisture sensitive materials used in each of a set of ganged unit sensors 202, may be selected to provide a humidity measurement that has high linearity.

Figure 4:
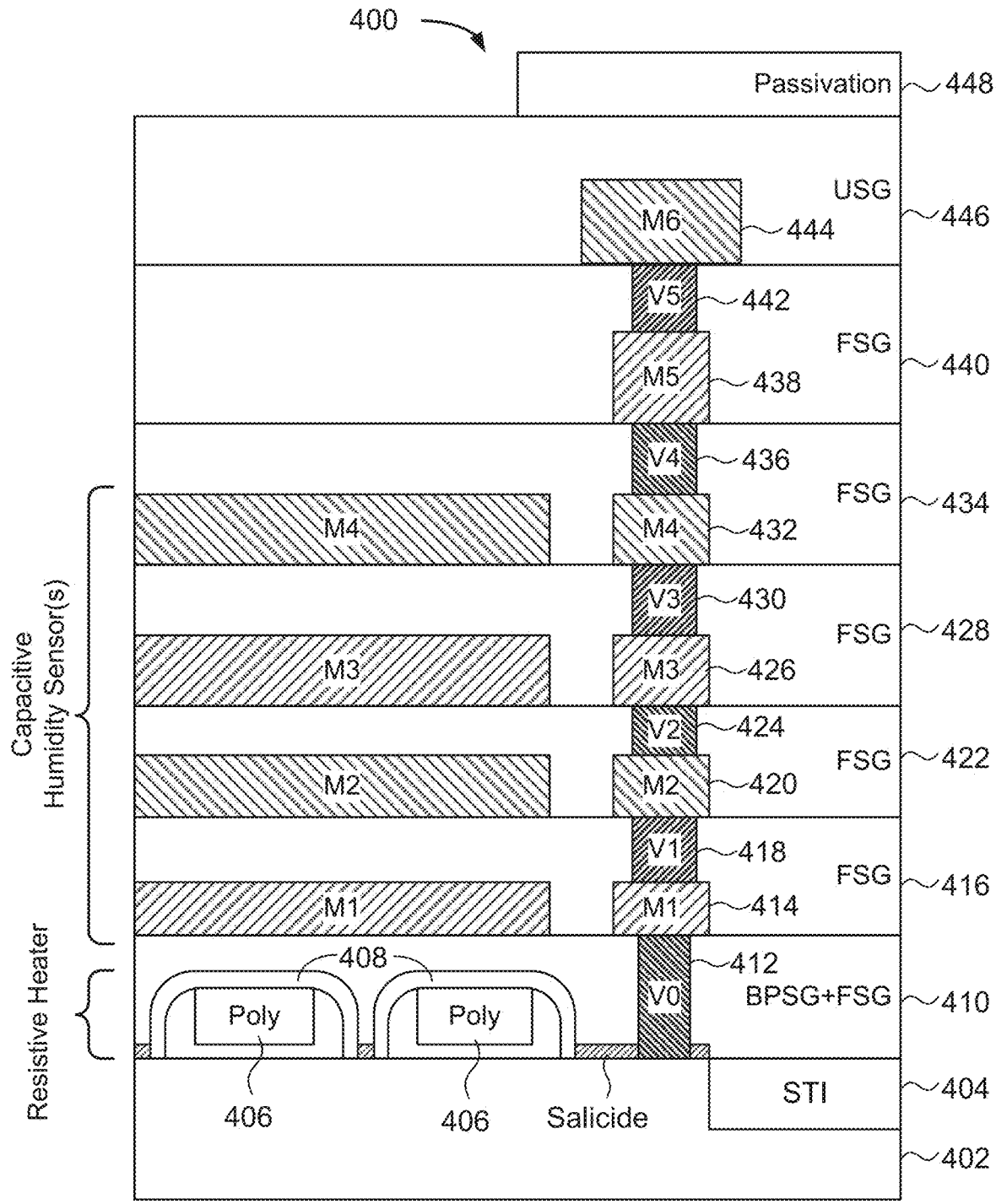
FIG. 4 is a cross-sectional view of a CMOS integrated humidity sensor with a built-in heater according to aspects of the disclosure.

FIG. 4 is a cross-sectional view of a unit sensor 400 according to aspects of the disclosure. In the example shown in FIG. 4, the unit sensor 400 includes a substrate 402 with an embedded STI layer 404, multiple fingers of the polysilicon structure 406, the first insulating layer 408 covering the fingers of the polysilicon structure 406 and having a thin layer of silicide between them, and the second insulating layer 410. A tungsten plug 412 makes an electrical connection to an M1 structure 414, part of which comprises an M1-level capacitor C1, that is embedded within a first dielectric layer 416. A level 1 via 418 connects the M1 structure 414 to an M2 structure 420, part of which comprises an M2-level capacitor C2, that is embedded within a second dielectric layer 422. A level 2 via 424 connects the M2 structure 420 to an M3 structure 426, part of which comprises an M3-level capacitor C3, that is embedded within a third dielectric layer 428. A level 3 via 430 connects the M3 structure 426 to an M4 structure 432, part of which comprises an M4-level capacitor C4, that is embedded within a fourth dielectric layer 434. A level 4 via 436 connects the M4 structure 432 to an M5 structure 438 that is embedded within a fifth dielectric layer 440. A level 5 via 442 connects the M5 structure 438 to an M6 structure 444 that is embedded within a sixth dielectric layer 446. A passivation layer 448 covers a portion of the top surface of the sixth dielectric layer 446. In the example shown in FIG. 4, the sixth dielectric layer 446 is comprised of undoped silicon glass (USG), the second insulating layer 410 is a mixture of borophosphate silicon glass (BPSG) and fluorosilicate glass (FSG), and the dielectric layers in between are FSG.

Figure 5:
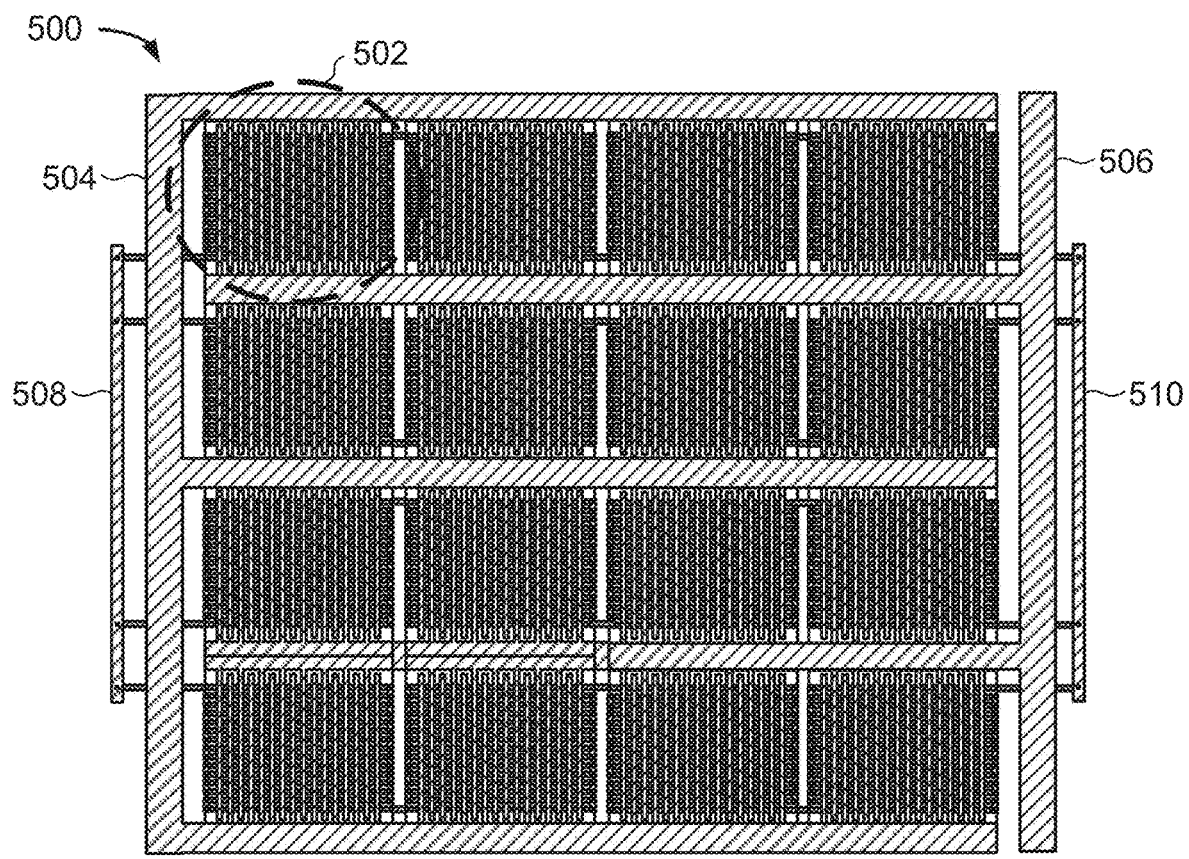
FIG. 5 is a plan view of a CMOS integrated humidity sensor with a built-in heater according to aspects of the disclosure.
Figure 5:
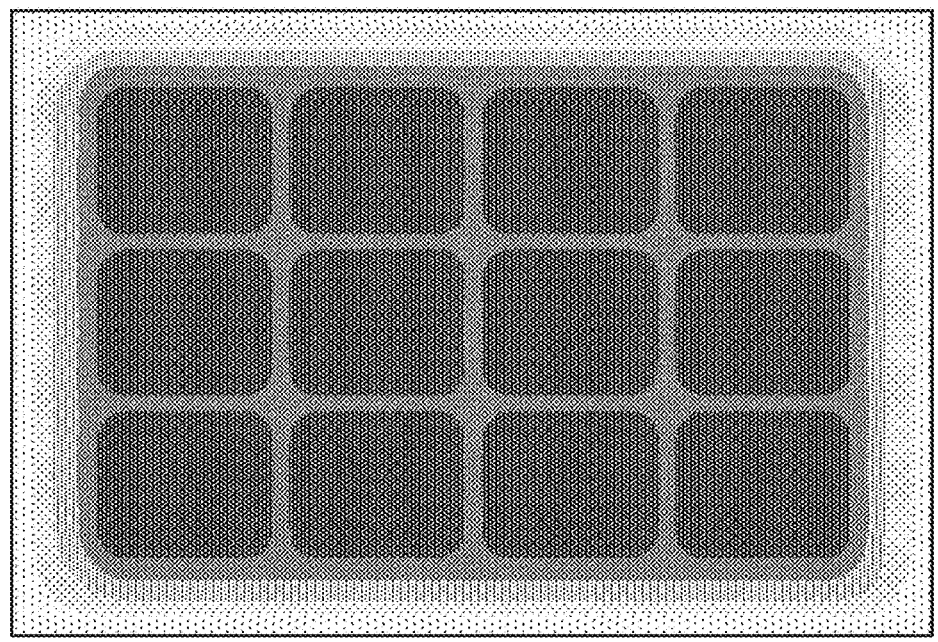

FIG. 5 is a plan view of a CMOS integrated humidity sensor 500 with a built-in heater according to aspects of the disclosure. In the example shown in FIG. 5, the humidity sensor 500 comprises a 4×4 array of unit sensors 502, and has common terminal 504 electrically connected to one plate of a capacitor, common terminal 506 electrically connected to the other plate of the capacitor, common terminal 508 electrically connected to end of the resistive heating element, and common terminal 510 electrically connected to other end of the resistive heating element. An example heat distribution profile 512 is also illustrated in FIG. 5, showing that heat is more evenly distributed across the surface of the entire humidity sensor 500 compared to the conventional design shown in FIG. 1

In some aspects, each unit sensor 502 has multiple capacitive humidity sensors, one at each of N different levels of metal (e.g., M1, M2, M3, etc.); thus, the humidity sensor 500 can be considered to be 4×4×N array of capacitive humidity sensors. Depending on the wiring connections between levels of metal within a unit sensor 502 and between unit sensors 502, many configurations are possible. In the example shown in FIG. 5, the capacitors at each metal level within all of the unit sensors 502 are electrically connected in parallel and the capacitors at all metal levels within all of the units sensors 502 are also electrically connected in parallel.

However, other configurations are also within the scope of the present disclosure. For example, the multiple capacitive humidity sensors within each unit sensor 502 may be coupled in parallel with each other, coupled in series with each other, or a combination of parallel and series. The unit sensors 502 may be coupled in parallel with other unit sensors 502, in series with other unit sensors 502, or a combination of parallel and series. In some aspects, for example, the capacitive humidity sensors at a particular level of metal (e.g., M1) of all of the unit sensors 502 may be coupled in parallel, in series, or in a combination of parallel and series across all of the unit sensor 502 within the humidity sensor 500, and further may be coupled in parallel, in series, or in combination of parallel and series with the capacitive humidity sensors at a different level of metal (e.g., M2) of al of the unit sensors 502 within the humidity sensor 500. These examples are not limiting, and illustrate the point that the individual capacitive humidity sensors a different levels of metal and within different unit sensors 502 may be connected to (or remain disconnected from) each other in many different configurations.

Figure 6:
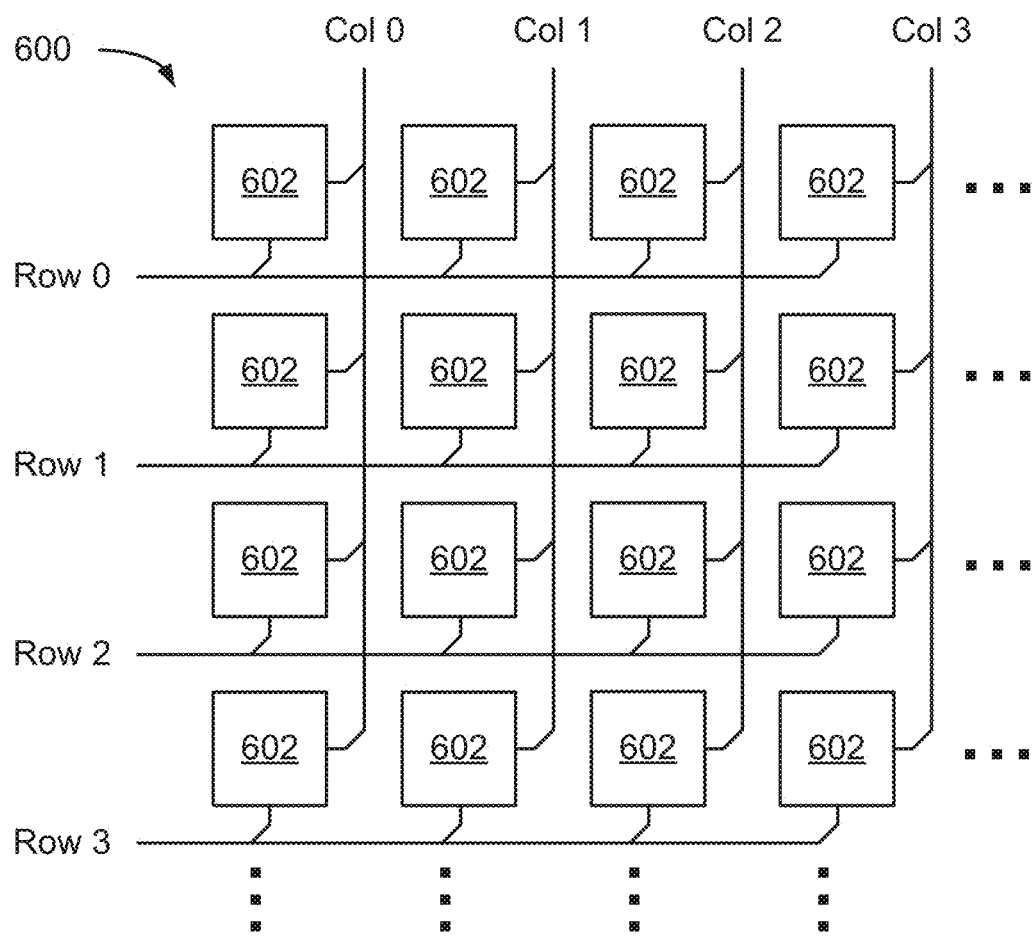
FIG. 6 is a schematic illustrating a CMOS integrated humidity sensor with a built-in heater according to aspects of the disclosure.

FIG. 6 is a schematic illustrating a CMOS integrated humidity sensor 600 with a built-in heater according to aspects of the disclosure. In the example illustrated in FIG. 6, the humidity sensor 600 includes a plurality of unit sensors 602. Each unit sensor 602 is individually controllable, e.g., via row control signals labeled Row 0, Row 1, etc., and column control signals labeled Col 0, Col 1, etc. This configuration has the advantage that, since each unit sensor operates individually, the humidity sensor 600 has built-in redundancy and can, for example, disable a failing unit sensor 602 rather than disable the entire humidity sensor 600. In some aspects, the resistance and capacitance of one or more of the unit sensors 602 can be modified to improve response to humidity, e.g., by adjusting the layout and/or element geometries, by changing the dielectric material or materials used, etc., without affecting the characteristics of other unit sensors 602. In some aspects, each unit sensor 602 may be enabled, disabled, or reset individually without affecting the operation of the other unit sensors 602. In some aspects, the sensitivity of the entire humidity sensor 600 may be dynamically tuned in response to changing conditions or needs, e.g., by activating or emphasizing different subsets of unit sensors 602 as appropriate.

In some aspects, the heating units of the unit sensors 602 can be individually controlled. In some aspects, a subset of one or more unit sensor 602 may be reset while the other unit sensors 602 remain operational. In some aspects, by controlling local heating, a heat gradient may be created across the humidity sensor 600 to accelerate the vapor diffusion from the unit sensors 602. For example, a heat gradient may be generated from the center to the edges of an array of unit sensors 602, or from left to right, or from top to bottom, etc. In some aspects, the temperature of a unit sensor 602 is proportional to the power P dissipated by its resistive heating element, where $P=Vbias2/R$. Thus, by applying different Vbias values in a controlled manner to the individual unit sensors 602, a heat gradient may be generated across an area of the humidity sensor 600. In some aspects, by implementing different resistor types (e.g., polysilicon resistor, diffusion resistor, or TiN BEOL resistor), R can be varied from unit sensor 602 to unit sensor 602 without changing the resistor geometry.

It will be noted that the capacitive humidity sensing elements of a set of unit sensors 602 may be wired together in the same configuration as, or a different configuration from, the heating elements of the set of unit sensors 602. For example, in some aspects, the capacitive humidity sensors are wired in series and the resistive heating elements are wired in parallel. In some aspects, the capacitive humidity sensors are wired in parallel and the resistive heating elements are wired in series. In some aspects, the capacitive humidity sensors are wired in parallel and the resistive heating elements are wired in parallel. In some aspects, the capacitive humidity sensors are wired in series and the resistive heating elements are wired in series. These examples are illustrative and not limiting.

Figure 7A:
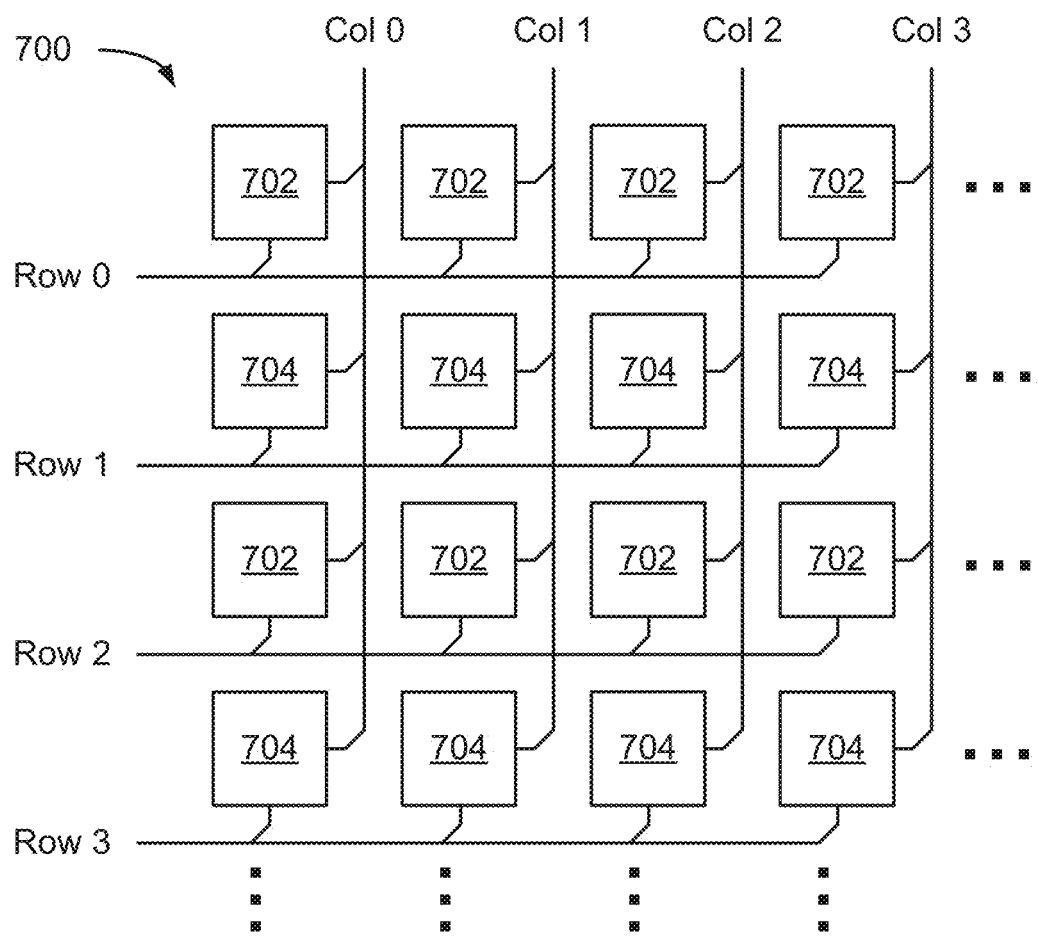
FIG. 7A is a schematic illustrating a CMOS integrated humidity sensor with a built-in heater according to aspects of the disclosure.

FIG. 7A is a schematic illustrating a CMOS integrated humidity sensor 700 with a built-in heater according to aspects of the disclosure. In the example illustrated in FIG. 7A, the humidity sensor 700 includes a plurality of individually controllable unit sensors, divided into a first type of unit sensor 702 and a second type of unit sensor 704. In some aspects, the first type of unit sensor 702 has at least one moisture sensitive dielectric material that is different from the moisture sensitive dielectric materials used in the second type of unit sensor 704. In some aspects, the first type of unit sensors 702 may use a first type of dielectric having a first sensitivity and range of detection, while the second type of unit sensors 704 may use a second type of dielectric having a second sensitivity and range of detection. In some aspects, this provides the humidity sensor 700 with a wider range of detection than a conventional humidity sensor could have with its single type of dielectric. In some aspects, the humidity sensor 700 could activate one of the types of unit sensors at a time while deactivating the other types of unit sensors.

Figure 7B:
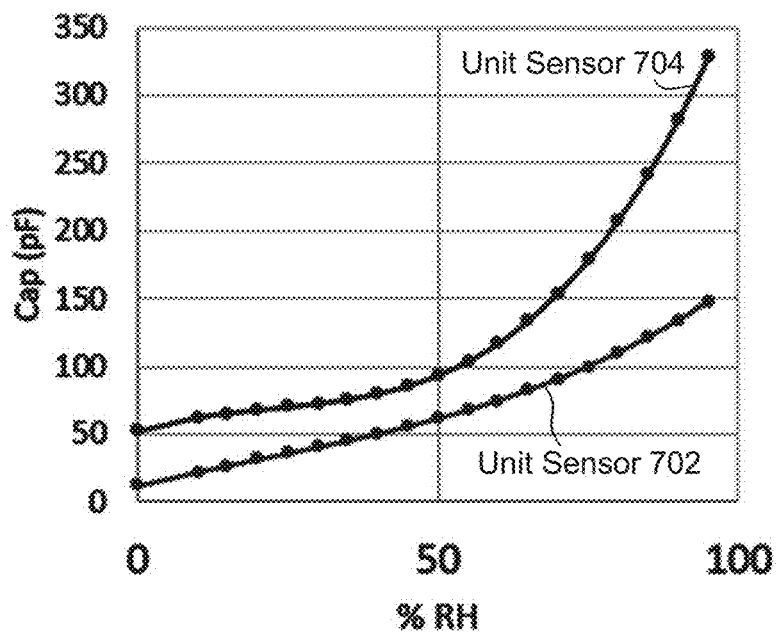
FIG. 7B is a graph comparing capacitance versus percent relative humidity responses of two unit sensors with different dielectric materials according to an aspect of the disclosure.

FIG. 7B is a graph illustrating a plot of capacitance versus percent relative humidity for the first type of unit sensor 702 and the second type of unit sensor 704 according to an aspect of the disclosure. This graph illustrates the point that some dielectric materials may have greater sensitivity to relative humidity, while other dielectric materials may have better linearity.

Figure 7C:
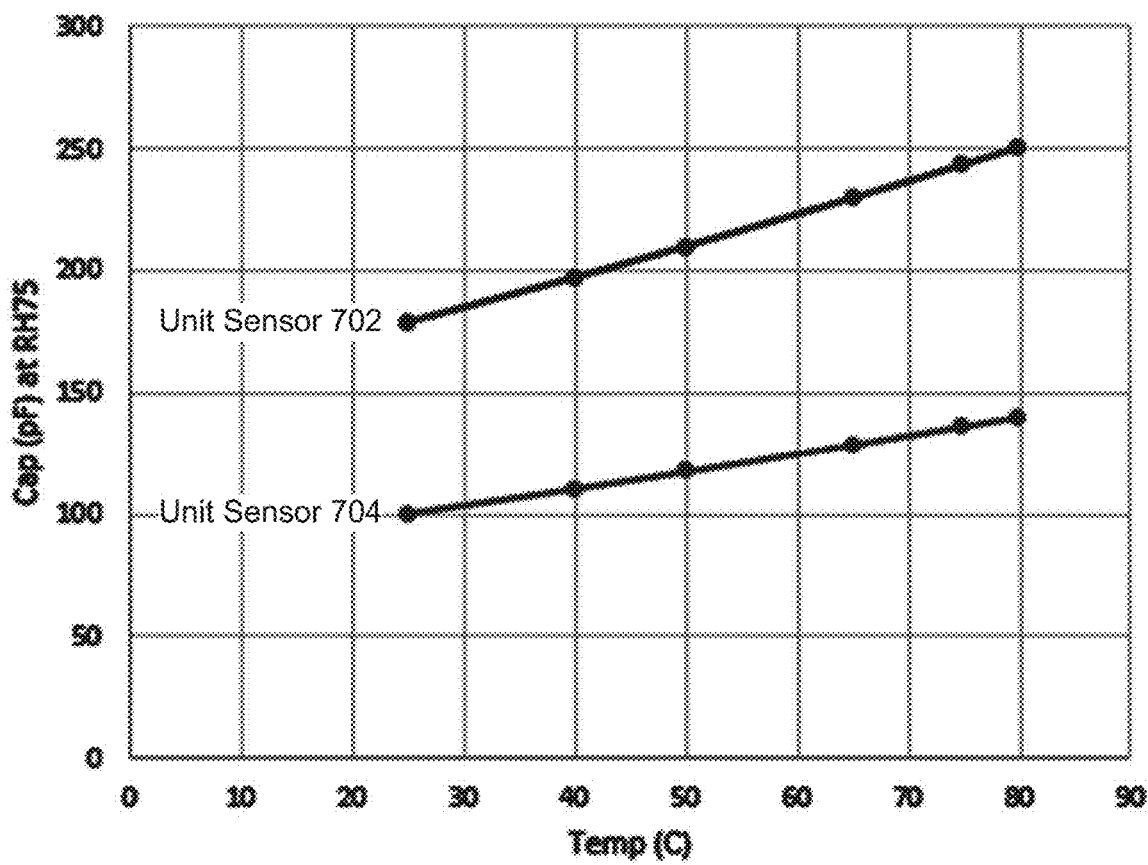
FIG. 7C is a graph comparing capacitance versus temperature responses of two unit sensors with different dielectric materials according to an aspect of the disclosure.

FIG. 7C is a graph illustrating a plot of capacitance versus temperature at a relative humidity of 75% for the first type of unit sensor 702 and the second type of unit sensor 704 according to an aspect of the disclosure. This graph illustrates the point that some dielectric materials may be affected more than other dielectric materials by changes in temperature. In some aspects, this phenomenon may be used advantageously to provide temperature sensing as well as humidity sensing.

For example, because sensor capacitance can be expressed as $C=C(RH=0\%)*\varepsilon*F(RH)$ at a fixed temperature, where $C(RH=0\%)$ is the capacitance at 0% relative humidity, & is the relative permittivity of the dielectric material, and $F(RH)$ is a function of relative humidity that describes the change in capacitance with respect to a change in relative humidity, it is possible to create a first lookup table that maps relative humidity to capacitance for each of the two sensor types. Because relative permittivity of a dielectric material is a function of temperature, it is possible to create a second lookup table that maps temperature to relative permittivity for each of the two sensor types. Then, if there is a change in relative humidity, then first lookup table can be used to determine the starting and ending humidity levels. From the ending humidity level, the equation above can be used to calculate the relative permittivity, which can be used with the second table to infer the instant temperature.

Figure 8:
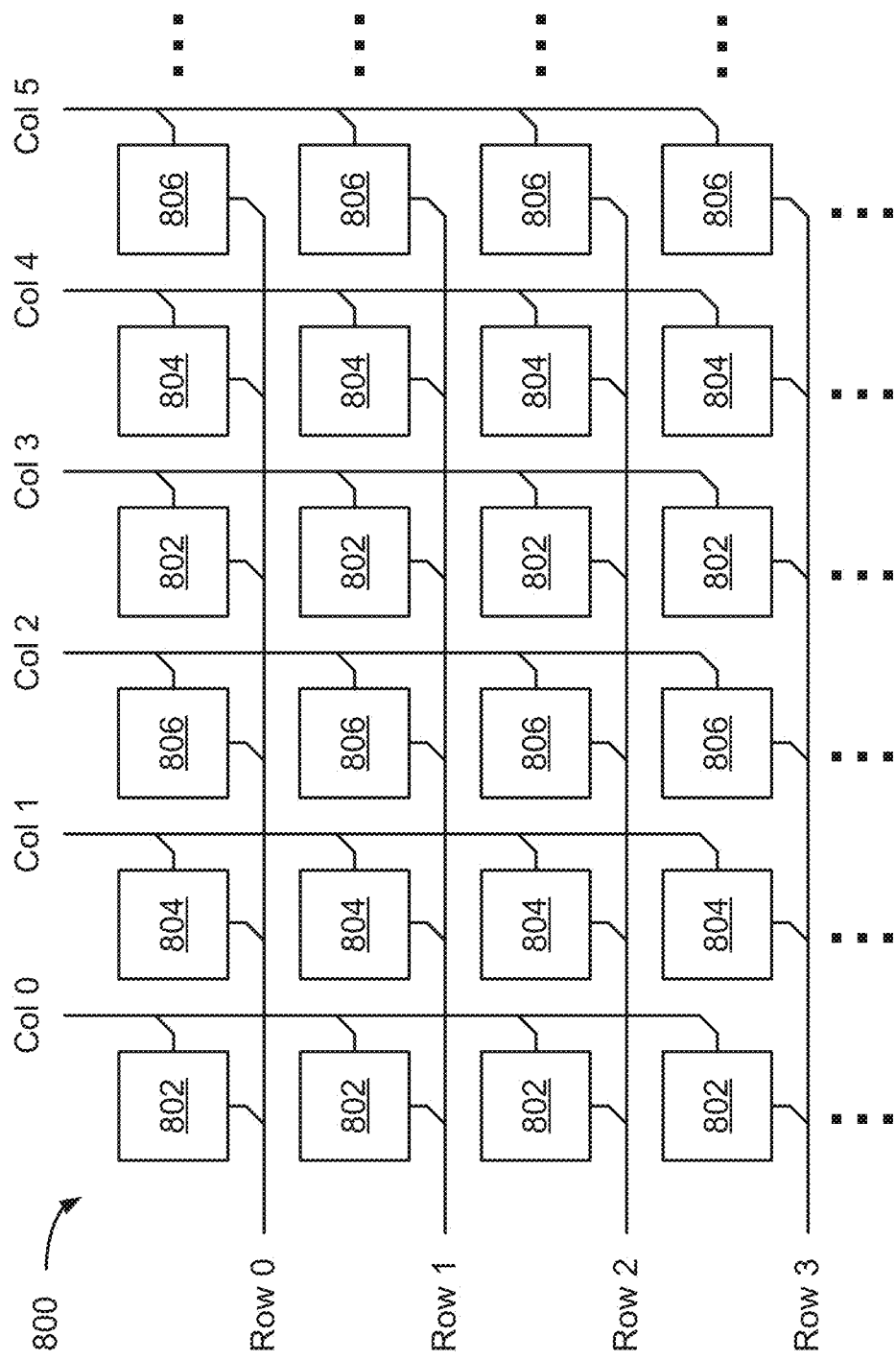
FIG. 8 is a schematic illustrating a CMOS integrated humidity sensor with a built-in heater according to aspects of the disclosure.

FIG. 8 is a schematic illustrating a CMOS integrated humidity sensor 800 with a built-in heater according to aspects of the disclosure. In the example illustrated in FIG. 8, the humidity sensor 800 includes a plurality of individually controllable unit sensors, divided into a first type of unit sensor 802, a second type of unit sensor 804, and a third type of unit sensor 806. In some aspects, each type of unit sensor has at least one moisture sensitive dielectric material that is different from the moisture sensitive dielectric materials used in the other types of unit sensors. In some aspects, each type of unit sensor may use a dielectric material having a different sensitivity, range, and/or linearity than the other types of unit sensors. Each dielectric material has a unique $\varepsilon r$ response to moisture content absorbed, i.e., $\varepsilon r$ vs. RH. The non-linear correlation impacts the overall linearity of the capacitive humidity sensor, e.g., $C=area*\varepsilon r/d$, where "d" is the vertical distance between the two metal plates that form the capacitor (i.e., the thickness of the dielectric material between the two metal plates). In some aspects, the outputs of different unit sensors fabricated with different dielectric material are combined, e.g., to create $Ceff=C1+C2+C3+\ldots$, which results in a more linear the response to humidity change over a wider range of relative humidity.

Figure 9:
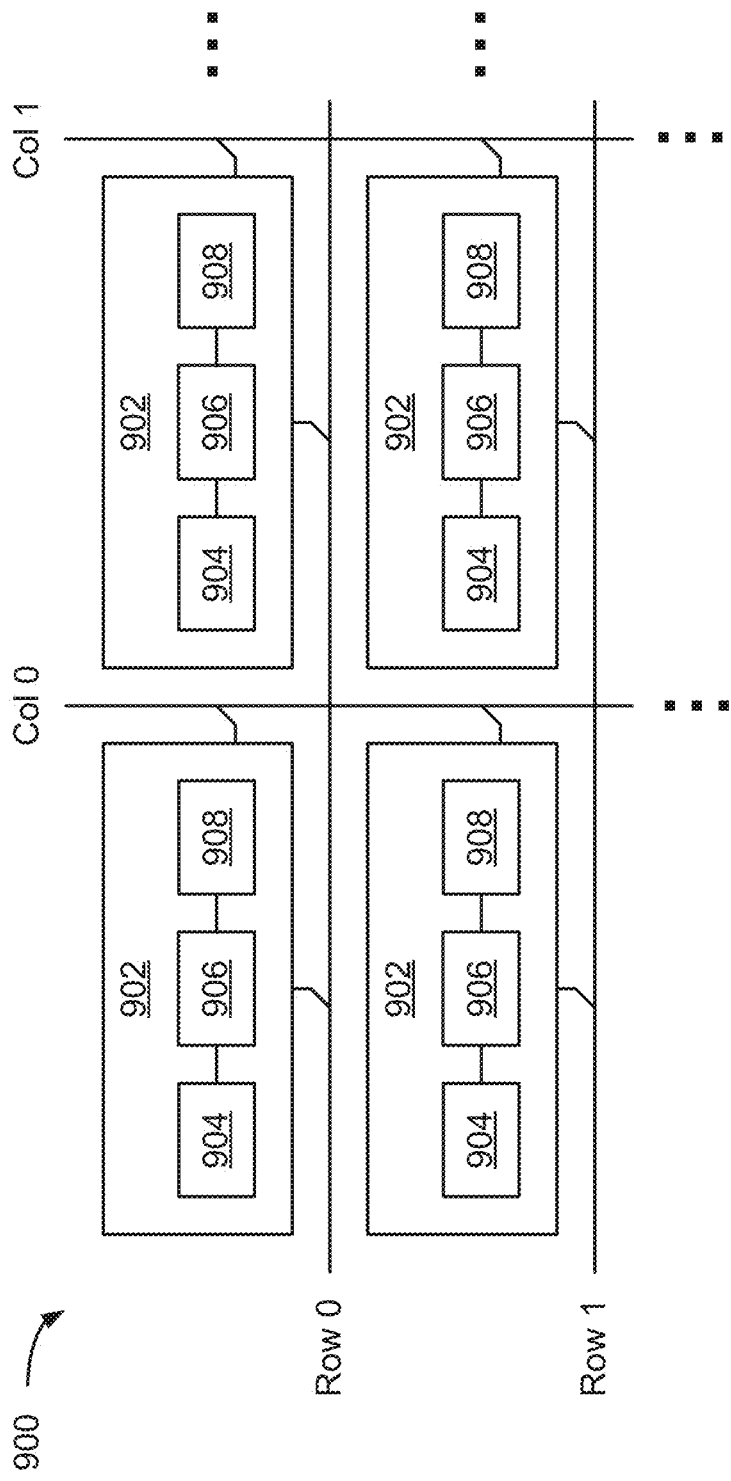
FIG. 9 is a schematic illustrating a CMOS integrated humidity sensor with a built-in heater according to aspects of the disclosure.

FIG. 9 is a schematic illustrating a CMOS integrated humidity sensor 900 with a built-in heater according to aspects of the disclosure. In the example illustrated in FIG. 9, the humidity sensor 900 includes a plurality of individually controllable unit sensors 902, where each unit sensor 902 includes sub-unit sensors of different types. In the example illustrated in FIG. 9, each unit sensor 902 includes a first sub-unit sensor 904 with a first type of dielectric, a second sub-unit sensor 906 with a second type of dielectric, and a third sub-unit sensor 908 with a third type of dielectric. In some aspects, each sub-unit sensor with a unit sensor 902 may use a dielectric material having a different sensitivity, range, and/or linearity than the other sub-unit sensors within the unit sensor 902. In some aspects, the sub-unit sensors may be wired in series with each other, in parallel with each other, or some combination of series and parallel configurations (e.g., two of the sub-unit sensors are wired in series, and that combination is wired in parallel with the other sub-unit sensor). For example, in some aspects, the unit sensor 902 is part of an LRC circuit in which the capacitance of the unit sensor 902 determines the resonant frequency of the LRC circuit. Connecting the three sub-units in of the unit sensor 902 in series provides a sharper resonance response, resulting in easier detection and better sensitivity.

Figure 10:
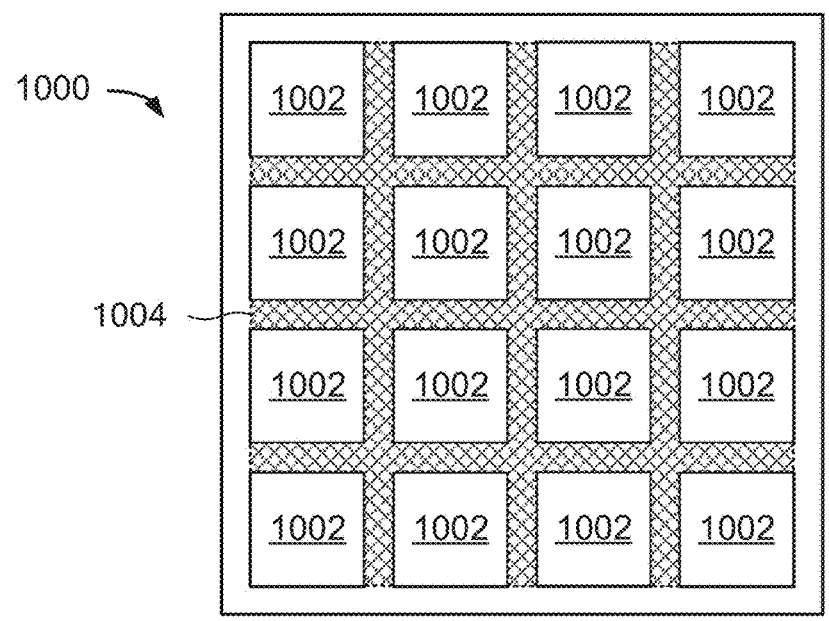
FIG. 10 is a plan view of a CMOS integrated humidity sensor with a built-in heater according to aspects of the disclosure.

FIG. 10 is a plan view of a CMOS integrated humidity sensor 1000 with a built-in heater according to aspects of the disclosure. In the example illustrated in FIG. 10, the humidity sensor 1000 includes a plurality of unit sensors 1002 FIG. 10 illustrates an additional advantage of this design-namely, that the portion 1004 between the unit sensors 1002, which is indicated in FIG. 10 by a fill pattern, provides additional area of the top surface of the humidity sensor 1000 that is exposed to the surrounding environment, which increases the water absorption and thereby improves the sensitivity of the humidity sensor 1000. The portion 1004 provides a material conduit by which moisture can travel from the outside environment to the sidewalls of the capacitive humidity sensor structures on and below the surface of each unit sensor 1002.

Figure 11:
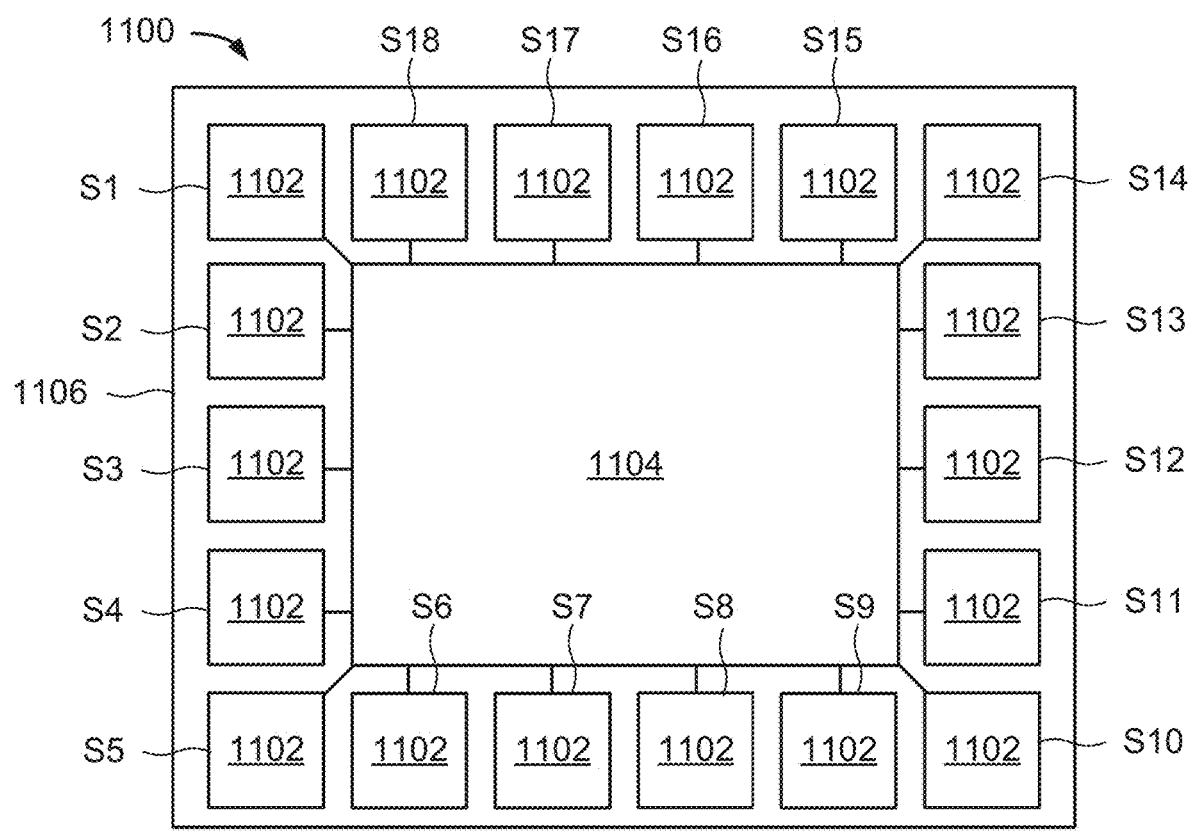
FIG. 11 is a plan view of a CMOS integrated humidity sensor with a built-in heater according to aspects of the disclosure.

FIG. 11 is a plan view of a CMOS integrated humidity sensor 1100 with a built-in heater according to aspects of the disclosure. In the example illustrated in FIG. 11, the humidity sensor 1100 include a set of unit sensors 1102 surrounding control circuitry 1104. In the example illustrated in FIG. 11, the unit sensors 1102 and the control circuitry 1104 are fabricated on a common substrate 1106. In the example illustrated in FIG. 11, each unit sensor 1102 can provide the control circuitry 1104 with a distinct humidity measurement (e.g., the unit sensors 1102 are coupled together in parallel. In some aspects, the unit sensors 1102 are individually controllable. The relative positions of the unit sensors 1102 to the control circuitry 1104 allows the control circuitry 1104 to determine, for example, direction of humidity ingression and the speed of humidity diffusion within the humidity sensor 1100, e.g., based on a comparison of the percentage change of capacitance of the unit sensors 1102.

Figure 12:
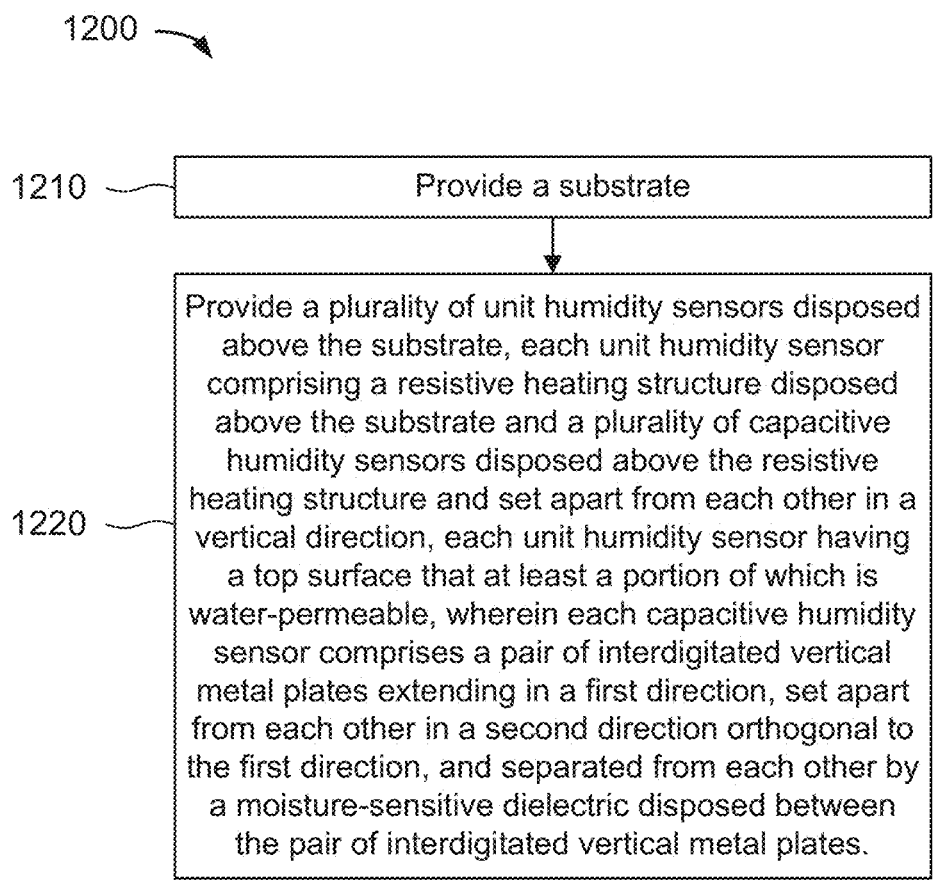
FIG. 12 is a flowchart illustrating a method for fabricating a CMOS integrated humidity sensor according to aspects of the disclosure.

FIG. 12 is a flowchart illustrating a method 1200 for fabricating a CMOS integrated humidity sensor according to aspects of the disclosure. As shown in FIG. 12, the method 1200 includes, at block 1210, providing a substrate. The method 1200 further includes, at block 1220, providing a plurality of unit humidity sensors disposed above the substrate, each unit humidity sensor comprising a resistive heating structure disposed above the substrate and a plurality of capacitive humidity sensors disposed above the resistive heating structure and set apart from each other in a vertical direction, each unit humidity sensor having a top surface that at least a portion of which is water-permeable, wherein each capacitive humidity sensor comprises a pair of interdigitated vertical metal plates extending in a first direction, set apart from each other in a second direction orthogonal to the first direction, and separated from each other by a moisture-sensitive dielectric disposed between the pair of interdigitated vertical metal plates.

In some aspects, providing the plurality of unit humidity sensors comprises providing the plurality of unit humidity sensors such that the moisture-sensitive dielectric of at least one of the plurality of capacitive humidity sensors of a first unit humidity sensor of the plurality of unit humidity sensors comprises a different material than another of the plurality of capacitive humidity sensors of the first unit humidity sensor or one of the plurality of capacity humidity sensors of a second unit humidity sensor of the plurality of unit humidity sensors.

In some aspects, providing the plurality of unit humidity sensors comprises providing the plurality of unit humidity sensors such that, for at least one of the plurality of unit humidity sensors, at least two of the plurality of capacitive humidity sensors are electrically connected to each other in parallel or in series.

In some aspects, providing the plurality of unit humidity sensors comprises providing the plurality of unit humidity sensors such that at least one of the plurality of capacitive humidity sensors of one of the plurality of unit humidity sensors is electrically connected in parallel or in series with at least one of the plurality of capacitive humidity sensors of another of the plurality of unit humidity sensors.

In some aspects, providing the plurality of unit humidity sensors comprises providing the plurality of unit humidity sensors such that the resistive heating structure of one of the plurality of unit humidity sensors is electrically connected in parallel or in series with the resistive heating structure of another of the plurality of unit humidity sensors.

In some aspects, the method 1200 further comprises providing control circuitry that controls the plurality of unit humidity sensors, that provides power to the resistive heating structure of each of the plurality of unit humidity sensors, and that determines a capacitance associated with at least one of the plurality of unit humidity sensors.

In some aspects, providing the control circuitry comprises providing the control circuitry that is configured to at least one of determine a direction and speed of moisture ingress into the capacitive humidity sensor based on a capacitance of two or more of the plurality of unit humidity sensors, determine an ambient temperature around the capacitive humidity sensor based on the capacitance of two or more of the plurality of unit humidity sensors, or determine a relative humidity based on the capacitance associated with each of at least two of the plurality of unit humidity sensors.

In some aspects, providing the control circuitry comprises providing the control circuitry that is configured to at least one of provide power to the resistive heating structure of each of the plurality of unit humidity sensors individually, or provide power to the resistive heating structure of each of the plurality of unit humidity sensors to create a heat gradient across at least one dimension of the capacitive humidity sensor.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A complementary metal oxide semiconductor (CMOS) integrated humidity sensor, comprising: a substrate; and a plurality of unit humidity sensors disposed above the substrate, each unit humidity sensor comprising a resistive heating structure disposed above the substrate and a plurality of capacitive humidity sensors disposed above the resistive heating structure and set apart from each other in a vertical direction, each unit humidity sensor having a top surface that at least a portion of which is water-permeable, wherein each capacitive humidity sensor comprises a pair of interdigitated vertical metal plates extending in a first direction, set apart from each other in a second direction orthogonal to the first direction, and separated from each other by a moisture-sensitive dielectric disposed between the pair of interdigitated vertical metal plates.

Clause 2. The CMOS integrated humidity sensor of clause 1, wherein for at least one unit humidity sensor of the plurality of unit humidity sensors, the moisture-sensitive dielectric of one of the plurality of capacitive humidity sensors of the at least one unit humidity sensor is a different material than the moisture-sensitive dielectric of another of the plurality of capacitive humidity sensors of the same unit humidity sensor.

Clause 3. The CMOS integrated humidity sensor of any of clauses 1 to 2, wherein for at least one of the plurality of unit humidity sensors, the moisture-sensitive dielectric of each of the plurality of capacitive humidity sensors of the at least one unit humidity sensor comprises a same material as the moisture-sensitive dielectric of the others of the plurality of capacitive humidity sensors of the same unit humidity sensor.

Clause 4. The CMOS integrated humidity sensor of any of clauses 1 to 3, wherein the moisture-sensitive dielectric of each of the plurality of capacitive humidity sensors of a first unit humidity sensor of the plurality of unit humidity sensors comprises a different material from the moisture-sensitive dielectric of each of the plurality of capacitive humidity sensors of a second unit humidity sensor of the plurality of unit humidity sensors.

Clause 5. The CMOS integrated humidity sensor of any of clauses 1 to 4, wherein for at least one of the plurality of unit humidity sensors, at least two of the plurality of capacitive humidity sensors are electrically connected to each other in parallel.

Clause 6. The CMOS integrated humidity sensor of any of clauses 1 to 5, wherein for at least one of the plurality of unit humidity sensors, at least two of the plurality of capacitive humidity sensors are electrically connected to each other in series.

Clause 7. The CMOS integrated humidity sensor of any of clauses 1 to 6, wherein at least one of the plurality of capacitive humidity sensors of one of the plurality of unit humidity sensors is electrically connected in parallel with at least one of the plurality of capacitive humidity sensors of another of the plurality of unit humidity sensors.

Clause 8. The CMOS integrated humidity sensor of any of clauses 1 to 7, wherein at least one of the plurality of capacitive humidity sensors of one of the plurality of unit humidity sensors is electrically connected in series with at least one of the plurality of capacitive humidity sensors of another of the plurality of unit humidity sensors.

Clause 9. The CMOS integrated humidity sensor of any of clauses 1 to 8, wherein the resistive heating structure of one of the plurality of unit humidity sensors is electrically connected in parallel with the resistive heating structure of another of the plurality of unit humidity sensors.

Clause 10. The CMOS integrated humidity sensor of any of clauses 1 to 9, wherein the resistive heating structure of one of the plurality of unit humidity sensors is electrically connected in series with the resistive heating structure of another of the plurality of unit humidity sensors.

Clause 11. The CMOS integrated humidity sensor of any of clauses 1 to 10, wherein the plurality of unit humidity sensors are configured in a two-dimensional array extending in the first direction and the second direction.

Clause 12. The CMOS integrated humidity sensor of any of clauses 1 to 11, wherein at least two of the plurality of unit humidity sensors are horizontally separated by a vertical, water-permeable material.

Clause 13. The CMOS integrated humidity sensor of any of clauses 1 to 12, further comprising control circuitry that controls the plurality of unit humidity sensors, that determines a capacitance associated with at least one of the plurality of unit humidity sensors, and that determines a relative humidity based on the capacitance.

Clause 14. The CMOS integrated humidity sensor of clause 13, wherein the control circuitry is configured to determine a direction and speed of moisture ingress into the capacitive humidity sensor based on a capacitance of two or more of the plurality of unit humidity sensors.

Clause 15. The CMOS integrated humidity sensor of any of clauses 13 to 14, wherein the control circuitry is configured to determine an ambient temperature around the capacitive humidity sensor based on a capacitance of two or more of the plurality of unit humidity sensors.

Clause 16. The CMOS integrated humidity sensor of any of clauses 13 to 15, wherein the control circuitry is configured to determine the relative humidity based on the capacitance associated with each of at least two of the plurality of unit humidity sensors.

Clause 17. The CMOS integrated humidity sensor of any of clauses 13 to 16, where the plurality of unit humidity sensors are disposed around a perimeter of the control circuitry.

Clause 18. The CMOS integrated humidity sensor of any of clauses 13 to 17, wherein the control circuitry is configured to provide power to the resistive heating structure of each of the plurality of unit humidity sensors.

Clause 19. The CMOS integrated humidity sensor of clause 18, wherein the control circuitry is configured to provide power to the resistive heating structure of each of the plurality of unit humidity sensors individually.

Clause 20. The CMOS integrated humidity sensor of any of clauses 18 to 19, wherein the control circuitry is configured to provide power to the resistive heating structures of the plurality of unit humidity sensors to create a heat gradient across at least one dimension of the capacitive humidity sensor.

Clause 21. A method of fabricating a CMOS integrated humidity sensor, the method comprising: providing a substrate; and providing a plurality of unit humidity sensors disposed above the substrate, each unit humidity sensor comprising a resistive heating structure disposed above the substrate and a plurality of capacitive humidity sensors disposed above the resistive heating structure and set apart from each other in a vertical direction, each unit humidity sensor having a top surface that at least a portion of which is water-permeable, wherein each capacitive humidity sensor comprises a pair of interdigitated vertical metal plates extending in a first direction, set apart from each other in a second direction orthogonal to the first direction, and separated from each other by a moisture-sensitive dielectric disposed between the pair of interdigitated vertical metal plates.

Clause 22. The method of clause 21, wherein providing the plurality of unit humidity sensors comprises providing the plurality of unit humidity sensors such that the moisture-sensitive dielectric of at least one of the plurality of capacitive humidity sensors of a first unit humidity sensor of the plurality of unit humidity sensors comprises a different material than another of the plurality of capacitive humidity sensors of the first unit humidity sensor or one of the plurality of capacity humidity sensors of a second unit humidity sensor of the plurality of unit humidity sensors.

Clause 23. The method of any of clauses 21 to 22, wherein providing the plurality of unit humidity sensors comprises providing the plurality of unit humidity sensors such that, for at least one of the plurality of unit humidity sensors, at least two of the plurality of capacitive humidity sensors are electrically connected to each other in parallel or in series.

Clause 24. The method of any of clauses 21 to 23, wherein providing the plurality of unit humidity sensors comprises providing the plurality of unit humidity sensors such that at least one of the plurality of capacitive humidity sensors of one of the plurality of unit humidity sensors is electrically connected in parallel or in series with at least one of the plurality of capacitive humidity sensors of another of the plurality of unit humidity sensors.

Clause 25. The method of any of clauses 21 to 24, wherein providing the plurality of unit humidity sensors comprises providing the plurality of unit humidity sensors such that the resistive heating structure of one of the plurality of unit humidity sensors is electrically connected in parallel or in series with the resistive heating structure of another of the plurality of unit humidity sensors.

Clause 26. The method of any of clauses 21 to 25, further comprising providing control circuitry that controls the plurality of unit humidity sensors, that provides power to the resistive heating structure of each of the plurality of unit humidity sensors, and that determines a capacitance associated with at least one of the plurality of unit humidity sensors.

Clause 27. The method of clause 26, wherein providing the control circuitry comprises providing the control circuitry that is configured to at least one of: determine a direction and speed of moisture ingress into the capacitive humidity sensor based on a capacitance of two or more of the plurality of unit humidity sensors; determine an ambient temperature around the capacitive humidity sensor based on the capacitance of two or more of the plurality of unit humidity sensors; or determine a relative humidity based on the capacitance associated with each of at least two of the plurality of unit humidity sensors.

Clause 28. The method of any of clauses 26 to 27, wherein providing the control circuitry comprises providing the control circuitry that is configured to at least one of: provide power to the resistive heating structure of each of the plurality of unit humidity sensors individually; or provide power to the resistive heating structure of each of the plurality of unit humidity sensors to create a heat gradient across at least one dimension of the capacitive humidity sensor.

Clause 29. An apparatus comprising: a substrate; a plurality of unit humidity sensors, each unit humidity sensor comprising a resistive heating structure disposed above the substrate and a plurality of capacitive humidity sensors disposed above the resistive heating structure and set apart from each other in a vertical direction, each unit humidity sensor having a top surface that at least a portion of which is water-permeable, each capacitive humidity sensor comprises a pair of interdigitated vertical metal plates extending in a first direction, set apart from each other in a second direction orthogonal to the first direction, and separated from each other by a moisture-sensitive dielectric disposed between the pair of interdigitated vertical metal plates; and control circuitry that controls the plurality of unit humidity sensors, that provides power to the resistive heating structures of the plurality of unit humidity sensors, that determines a capacitance associated with at least one of the plurality of unit humidity sensors, and that determines a relative humidity based on the capacitance.

Clause 30. An apparatus comprising: a plurality of unit humidity sensor means, each unit humidity sensor means comprising a resistive heating means and a plurality of capacitive humidity sensor means disposed above the resistive heating means and set apart from each other in a vertical direction, each unit humidity sensor having a top surface that at least a portion of which is water-permeable, each capacitive humidity sensor comprising a pair of interdigitated vertical metal plates extending in a first direction, set apart from each other in a second direction orthogonal to the first direction, and separated from each other by a moisture-sensitive dielectric disposed between the pair of interdigitated vertical metal plates; and control circuitry means that controls the plurality of unit humidity sensor means, that provides power to the resistive heating means of the plurality of unit humidity sensor means, that determines a capacitance associated with at least one of the plurality of unit humidity sensor means, and that determines a relative humidity based on the capacitance.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. For example, the functions, steps and/or actions of the method claims in accordance with the aspects of the disclosure described herein need not be performed in any particular order. Further, no component, function, action, or instruction described or claimed herein should be construed as critical or essential unless explicitly described as such. Furthermore, as used herein, the terms "set," "group," and the like are intended to include one or more of the stated elements. Also, as used herein, the terms "has," "have," "having," "comprises," "comprising," "includes," "including," and the like does not preclude the presence of one or more additional elements (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of") or the alternatives are mutually exclusive (e.g., "one or more" should not be interpreted as "one and more"). Furthermore, although components, functions, actions, and instructions may be described or claimed in the singular, the plural is contemplated unless limitation to the singular is explicitly stated. Accordingly, as used herein, the articles "a," "an," "the," and "said" are intended to include one or more of the stated elements. Additionally, as used herein, the terms "at least one" and "one or more" encompass "one" component, function, action, or instruction performing or capable of performing a described or claimed functionality and also "two or more" components, functions, actions, or instructions performing or capable of performing a described or claimed functionality in combination.

What is claimed is:

1. A complementary metal oxide semiconductor (CMOS) integrated humidity sensor, comprising:
   a substrate; and
   a plurality of unit humidity sensors disposed above the substrate, each unit humidity sensor comprising a resistive heating structure disposed above the substrate and a plurality of capacitive humidity sensors disposed above the resistive heating structure and set apart from each other in a vertical direction, each unit humidity sensor having a top surface that at least a portion of which is water-permeable,
   wherein each capacitive humidity sensor comprises a pair of interdigitated vertical metal plates extending in a first direction, set apart from each other in a second direction orthogonal to the first direction, and separated from each other by a moisture-sensitive dielectric disposed between the pair of interdigitated vertical metal plates.

2. The CMOS integrated humidity sensor of claim 1, wherein for at least one unit humidity sensor of the plurality of unit humidity sensors, the moisture-sensitive dielectric of one of the plurality of capacitive humidity sensors of the at least one unit humidity sensor is a different material than the moisture-sensitive dielectric of another of the plurality of capacitive humidity sensors of the same unit humidity sensor.

3. The CMOS integrated humidity sensor of claim 1, wherein for at least one of the plurality of unit humidity sensors, the moisture-sensitive dielectric of each of the plurality of capacitive humidity sensors of the at least one unit humidity sensor comprises a same material as the moisture-sensitive dielectric of the others of the plurality of capacitive humidity sensors of the same unit humidity sensor.

4. The CMOS integrated humidity sensor of claim 1, wherein the moisture-sensitive dielectric of each of the plurality of capacitive humidity sensors of a first unit humidity sensor of the plurality of unit humidity sensors comprises a different material from the moisture-sensitive dielectric of each of the plurality of capacitive humidity sensors of a second unit humidity sensor of the plurality of unit humidity sensors.

5. The CMOS integrated humidity sensor of claim 1, wherein for at least one of the plurality of unit humidity sensors, at least two of the plurality of capacitive humidity sensors are electrically connected to each other in parallel.

6. The CMOS integrated humidity sensor of claim 1, wherein for at least one of the plurality of unit humidity sensors, at least two of the plurality of capacitive humidity sensors are electrically connected to each other in series.

7. The CMOS integrated humidity sensor of claim 1, wherein at least one of the plurality of capacitive humidity sensors of one of the plurality of unit humidity sensors is electrically connected in parallel with at least one of the plurality of capacitive humidity sensors of another of the plurality of unit humidity sensors.

8. The CMOS integrated humidity sensor of claim 1, wherein at least one of the plurality of capacitive humidity sensors of one of the plurality of unit humidity sensors is electrically connected in series with at least one of the plurality of capacitive humidity sensors of another of the plurality of unit humidity sensors.

9. The CMOS integrated humidity sensor of claim 1, wherein the resistive heating structure of one of the plurality of unit humidity sensors is electrically connected in parallel with the resistive heating structure of another of the plurality of unit humidity sensors.

10. The CMOS integrated humidity sensor of claim 1, wherein the resistive heating structure of one of the plurality of unit humidity sensors is electrically connected in series with the resistive heating structure of another of the plurality of unit humidity sensors.

11. The CMOS integrated humidity sensor of claim 1, wherein the plurality of unit humidity sensors are configured in a two-dimensional array extending in the first direction and the second direction.

12. The CMOS integrated humidity sensor of claim 1, wherein at least two of the plurality of unit humidity sensors are horizontally separated by a vertical, water-permeable material.

13. The CMOS integrated humidity sensor of claim 1, further comprising control circuitry that controls the plurality of unit humidity sensors, that determines a capacitance associated with at least one of the plurality of unit humidity sensors, and that determines a relative humidity based on the capacitance.

14. The CMOS integrated humidity sensor of claim 13, wherein the control circuitry is configured to determine a direction and speed of moisture ingress into the capacitive humidity sensor based on a capacitance of two or more of the plurality of unit humidity sensors.

15. The CMOS integrated humidity sensor of claim 13, wherein the control circuitry is configured to determine an ambient temperature around the capacitive humidity sensor based on a capacitance of two or more of the plurality of unit humidity sensors.

16. The CMOS integrated humidity sensor of claim 13, wherein the control circuitry is configured to determine the relative humidity based on the capacitance associated with each of at least two of the plurality of unit humidity sensors.

17. The CMOS integrated humidity sensor of claim 13, where the plurality of unit humidity sensors are disposed around a perimeter of the control circuitry.

18. The CMOS integrated humidity sensor of claim 13, wherein the control circuitry is configured to provide power to the resistive heating structure of each of the plurality of unit humidity sensors.

19. The CMOS integrated humidity sensor of claim 18, wherein the control circuitry is configured to provide power to the resistive heating structure of each of the plurality of unit humidity sensors individually.

20. The CMOS integrated humidity sensor of claim 18, wherein the control circuitry is configured to provide power to the resistive heating structures of the plurality of unit humidity sensors to create a heat gradient across at least one dimension of the capacitive humidity sensor.

21. A method of fabricating a complementary metal oxide semiconductor (CMOS) integrated humidity sensor, the method comprising:
providing a substrate; and
providing a plurality of unit humidity sensors disposed above the substrate, each unit humidity sensor comprising a resistive heating structure disposed above the substrate and a plurality of capacitive humidity sensors disposed above the resistive heating structure and set apart from each other in a vertical direction, each unit humidity sensor having a top surface that at least a portion of which is water-permeable,
wherein each capacitive humidity sensor comprises a pair of interdigitated vertical metal plates extending in a first direction, set apart from each other in a second direction orthogonal to the first direction, and separated from each other by a moisture-sensitive dielectric disposed between the pair of interdigitated vertical metal plates.

22. The method of claim 21, wherein providing the plurality of unit humidity sensors comprises providing the plurality of unit humidity sensors such that the moisture-sensitive dielectric of at least one of the plurality of capacitive humidity sensors of a first unit humidity sensor of the plurality of unit humidity sensors comprises a different material than another of the plurality of capacitive humidity sensors of the first unit humidity sensor or one of the plurality of capacity humidity sensors of a second unit humidity sensor of the plurality of unit humidity sensors.

23. The method of claim 21, wherein providing the plurality of unit humidity sensors comprises providing the plurality of unit humidity sensors such that, for at least one of the plurality of unit humidity sensors, at least two of the plurality of capacitive humidity sensors are electrically connected to each other in parallel or in series.

24. The method of claim 21, wherein providing the plurality of unit humidity sensors comprises providing the plurality of unit humidity sensors such that at least one of the plurality of capacitive humidity sensors of one of the plurality of unit humidity sensors is electrically connected in parallel or in series with at least one of the plurality of capacitive humidity sensors of another of the plurality of unit humidity sensors.

25. The method of claim 21, wherein providing the plurality of unit humidity sensors comprises providing the plurality of unit humidity sensors such that the resistive heating structure of one of the plurality of unit humidity sensors is electrically connected in parallel or in series with the resistive heating structure of another of the plurality of unit humidity sensors.

26. The method of claim 21, further comprising providing control circuitry that controls the plurality of unit humidity sensors, that provides power to the resistive heating structure of each of the plurality of unit humidity sensors, and that determines a capacitance associated with at least one of the plurality of unit humidity sensors.

27. The method of claim 26, wherein providing the control circuitry comprises providing the control circuitry that is configured to at least one of:

determine a direction and speed of moisture ingress into the capacitive humidity sensor based on a capacitance of two or more of the plurality of unit humidity sensors;
determine an ambient temperature around the capacitive humidity sensor based on the capacitance of two or more of the plurality of unit humidity sensors; or
determine a relative humidity based on the capacitance associated with each of at least two of the plurality of unit humidity sensors.

28. The method of claim 26, wherein providing the control circuitry comprises providing the control circuitry that is configured to at least one of:
provide power to the resistive heating structure of each of the plurality of unit humidity sensors individually; or
provide power to the resistive heating structure of each of the plurality of unit humidity sensors to create a heat gradient across at least one dimension of the capacitive humidity sensor.

29. An apparatus comprising:
a substrate;
a plurality of unit humidity sensors, each unit humidity sensor comprising a resistive heating structure disposed above the substrate and a plurality of capacitive humidity sensors disposed above the resistive heating structure and set apart from each other in a vertical direction, each unit humidity sensor having a top surface that at least a portion of which is water-permeable, each capacitive humidity sensor comprises a pair of interdigitated vertical metal plates extending in a first direction, set apart from each other in a second direction orthogonal to the first direction, and separated from each other by a moisture-sensitive dielectric disposed between the pair of interdigitated vertical metal plates; and
control circuitry that controls the plurality of unit humidity sensors, that provides power to the resistive heating structures of the plurality of unit humidity sensors, that determines a capacitance associated with at least one of the plurality of unit humidity sensors, and that determines a relative humidity based on the capacitance.

30. An apparatus comprising:
a plurality of unit humidity sensor means, each unit humidity sensor means comprising a resistive heating means and a plurality of capacitive humidity sensor means disposed above the resistive heating means and set apart from each other in a vertical direction, each unit humidity sensor having a top surface that at least a portion of which is water-permeable, each capacitive humidity sensor comprising a pair of interdigitated vertical metal plates extending in a first direction, set apart from each other in a second direction orthogonal to the first direction, and separated from each other by a moisture-sensitive dielectric disposed between the pair of interdigitated vertical metal plates; and
control circuitry means that controls the plurality of unit humidity sensor means, that provides power to the resistive heating means of the plurality of unit humidity sensor means, that determines a capacitance associated with at least one of the plurality of unit humidity sensor means, and that determines a relative humidity based on the capacitance.

* * * * *